(12) United States Patent
Poslinski

(10) Patent No.: US 7,738,773 B2
(45) Date of Patent: Jun. 15, 2010

(54) WISH LIST FOR TELEVISION RECORDING

(75) Inventor: Thomas Poslinski, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2339 days.

(21) Appl. No.: 10/299,318

(22) Filed: Nov. 19, 2002

(65) Prior Publication Data

US 2004/0096184 A1 May 20, 2004

(51) Int. Cl.
*H04N 5/91* (2006.01)
(52) U.S. Cl. .............................. 386/83; 386/46; 725/104
(58) Field of Classification Search ................... 386/83, 386/46
See application file for complete search history.

(56) References Cited

U.S. PATENT DOCUMENTS

| 5,293,357 | A | 3/1994 | Hallenbeck | 348/734 |
| 5,517,254 | A | 5/1996 | Monta et al. | 348/569 |
| 5,576,773 | A | 11/1996 | Itagaki et al. | 348/734 |
| 5,734,444 | A | 3/1998 | Yoshinobu | 348/731 |
| 5,977,964 | A | 11/1999 | Williams et al. | 345/327 |
| 6,324,338 | B1 | 11/2001 | Wood et al. | 386/83 |
| 6,344,878 | B1 | 2/2002 | Emura | 348/460 |
| 6,370,317 | B2 | 4/2002 | Nagano et al. | 386/83 |
| 6,415,099 | B1 | 7/2002 | Berger | 386/83 |
| 6,721,954 | B1* | 4/2004 | Nickum | 725/46 |
| 7,370,343 | B1* | 5/2008 | Ellis | 725/58 |
| 2002/0009285 | A1* | 1/2002 | Safadi et al. | 386/46 |
| 2002/0046404 | A1 | 4/2002 | Mizutani | 725/58 |
| 2002/0054752 | A1 | 5/2002 | Wood et al. | 386/83 |
| 2002/0056108 | A1 | 5/2002 | Gerharter et al. | 725/58 |
| 2002/0092021 | A1* | 7/2002 | Yap et al. | 725/55 |
| 2002/0092022 | A1 | 7/2002 | Dudkicwicz et al. | 725/58 |
| 2002/0102094 | A1* | 8/2002 | Hawkins | 386/83 |
| 2002/0118954 | A1 | 8/2002 | Barton et al. | 386/83 |
| 2003/0121057 | A1* | 6/2003 | Singh | 725/132 |
| 2005/0204387 | A1* | 9/2005 | Knudson et al. | 725/52 |
| 2006/0140584 | A1* | 6/2006 | Ellis et al. | 386/83 |

* cited by examiner

*Primary Examiner*—Thai Tran
*Assistant Examiner*—Girumsew Wendmagegn
(74) *Attorney, Agent, or Firm*—John L. Rogitz

(57) ABSTRACT

A viewer can enter into a wish list a show listed on an electronic program guide (EPG) that is being shown on a channel not subscribed to by the viewer. Should the show later become available on a subscribed-to channel, it is automatically recorded.

5 Claims, 1 Drawing Sheet

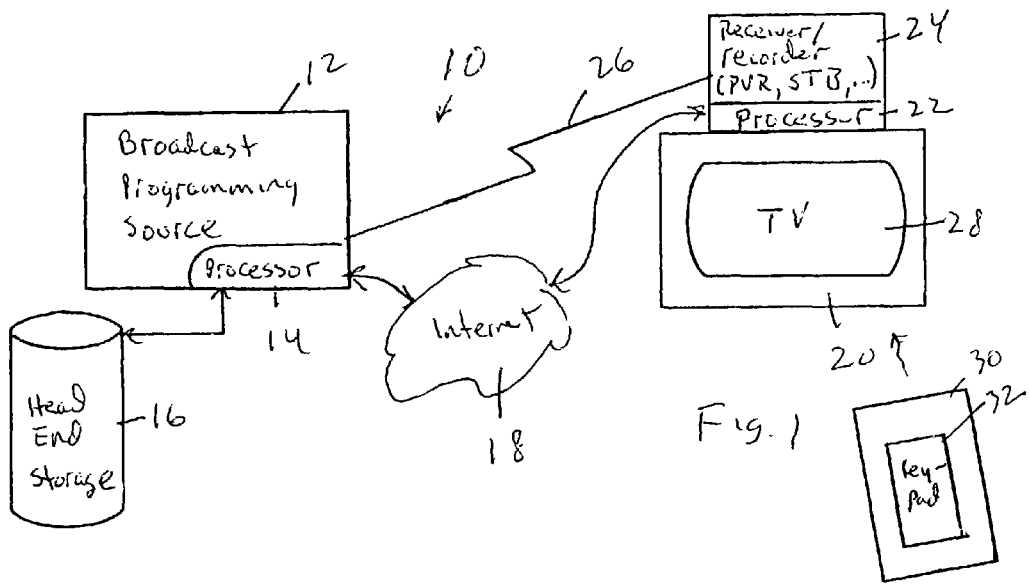
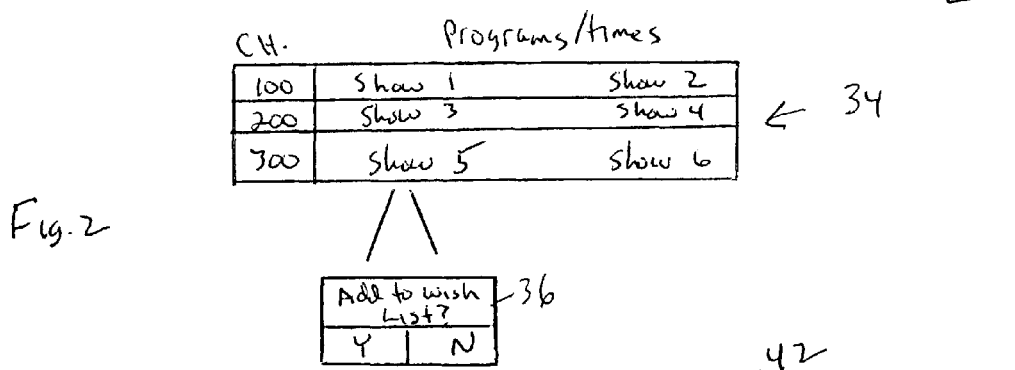
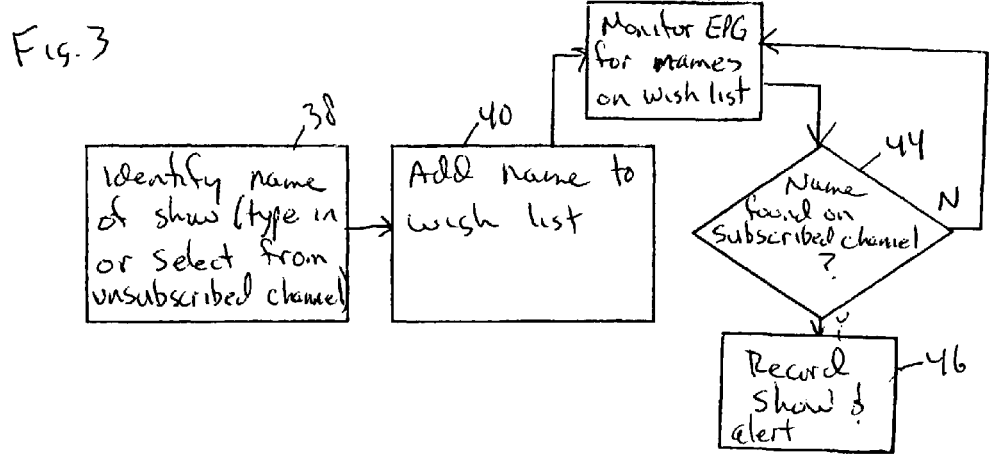

WISH LIST FOR TELEVISION RECORDING

I. FIELD OF THE INVENTION

The present invention relates generally to television systems.

II. BACKGROUND OF THE INVENTION

Modern digital television systems can be programmed to record broadcast content, including broadcast digitized content, that is received over a satellite link or cable link. The content typically includes television programs and accompanying commercials, and once programmed, the recording device of a system records the desired shows.

Currently, among other methods a viewer can use the electronic program guide (EPG) of a TV to record a show that is listed on the EPG, assuming that the show is on a subscribed-to channel. But if the show is on an non-subscribed-to channel, it can't be recorded, of course, even if it's listed on the EPG. Should the show later become available on a subscribed-to channel, the viewer must notice it and cause the show to be recorded, even if it is many months in the future. As recognized by the present invention, this is inconvenient.

SUMMARY OF THE INVENTION

A system for recording televised content includes a local processor and a television coupled to the local processor. The system also includes a source of television show content communicating content to the processor. A viewer of the television can add a show on a channel not subscribed to by the viewer to a wish list such that the processor causes the show to be recorded when it becomes available on a channel subscribed to by the viewer.

In a preferred non-limiting embodiment, the processor causes the viewer to be alerted when show has been recorded. A remote control device can be associated with the processor so that the show can be added to the wish list by manipulating the remote control device to enter alpha-numeric characters representing the name of the show. Or, the show can be added to the wish list by manipulating the remote control device to select the show as it is displayed on an electronic program guide (EPG) of the television.

In another aspect, a method for providing broadcast content to a viewer includes selecting, from a non-subscribed channel, a show desired to be recorded, and then automatically monitoring an electronic program guide for the show. The show is automatically recorded when it becomes available on a subscribed-to channel.

In still another aspect, a television system is configured for receiving an electronic program guide (EPG) that lists at least one channel subscribed to by the system and at least one channel that is not subscribed to by the system. The system includes a television, a processor associated with the television, and a data entry-device associated with the processor. The processor is programmed to receive input from the data entry device representing a wished-for show on the channel not subscribed to by the system. The processor is further programmed to record the show when it becomes available on the channel subscribed to by the system.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a system of the present invention;

FIG. 2 is a schematic diagram of an EPG with drop-down menu for adding a show to a wish list; and FIG. 3 is a flow chart of the logic of the present invention.

DETAILED DESCRIPTION OF THE PREFERRED EMBODIMENT

Referring initially to FIG. 1, cable or satellite television (TV) system 10 is shown that includes a broadcast programming/content source 12, sometimes referred to as a "head end" of a service provider. The source 12 includes a processor 14, which could be embodied in a media server for providing in a broadcast or on demand movies, television shows, and other programming content that may be obtained from a head end data storage 16. The source processor 14 may also provide additional content that is available on the Internet 18. It is to be understood that the source 12 includes an appropriate transmitter for broadcasting content in accordance with cable, satellite, or other broadcast principles known in the art.

The system 10 also includes plural viewer television systems, only one of which is shown in FIG. 1 for convenience of disclosure. Accordingly, a viewer's television 20 is provided that may be coupled to one or more local processors 22 for undertaking the present invention. The local processor 22 may be embodied in a personal digital recorder that can be implemented as personal video recorder (PVR), in a separate or integrated set top box 24, or other recording device. If desired, all of the viewer components shown in FIG. 1 may be housed together, or they may be separate components as shown.

The preferred, non-limiting set top box 24 can provide bi-directional communication over a transmission path 26 with the source 12, in the case of a cable-based system 10. In other embodiments, bi-directional communication can be effected using asymmetrical communication techniques such as dual communication media—one for the uplink and one for the downlink. Specifically, content can be received from the source 12 over the path 26, which might be a satellite link, while communication from the local processor 22 to the source 12 can be provided via the Internet 18.

Accordingly, the source processor 14 can be coupled by the transmission path 26 to the local processor 22. The transmission path 26 may include, for example, a conventional coaxial cable network, a fiber optic cable network, telephone system, or a twisted pair. Or, as mentioned above the transmission path 26 may be wireless, in which case it can include a satellite communication system, a radio frequency (RF) system, a microwave system, other wireless systems, a combination of wired and wireless systems or any of a variety of known electronic transmission mediums. In the case of a cable television network, the transmission path 26 is commonly realized at the subscriber's premises as a coaxial cable that is connected to a suitable cable connector at the rear panel of the STB 24. In the case of a Direct Satellite System (DSS), the STB 24 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 24.

The TV 20 may be a digital television having a video display 28 for displaying programming, an EPG as shown in FIG. 2, etc. The STB 24 may be coupled to the TV 24 and various other audio/visual devices 26 and Internet Appliances by an appropriate interface, which may be any suitable analog or digital interface. In one embodiment, the interface conforms to an interface standard such as the Institute of Electrical and Electronics Engineers (IEEE) 1394 standard. In addition to the local processor 22, the preferred non-limiting STB 24 may include memory such as Random Access Memory (RAM), Read Only Memory (ROM), flash memory, mass storage such as a hard disc drive, floppy disc drive, optical disc drive or may accommodate other electronic storage media, etc. Such memory and storage media are suitable for storing data as well as instructions for programmed processes for execution on the local processor 22, in accordance with principles set forth below. Also, the STB 24 may include circuitry suitable for audio decoding and processing, as well as the decoding of video data compressed in accordance with a compression standard such as the Motion Pictures Experts Group (MPEG) standard and other processing to form a controller or central hub. In non-limiting embodiment, the STB 24 may be coupled to or incorporate devices such as a personal computer, video cassette recorder, cam corder, digital camera, personal digital assistant and other audio/visual or Internet related devices.

In addition, a data transport architecture, such as that set forth by an industry group which includes Sony Corporation and known as the Home Audio-Video Interoperability (HAVi) architecture may be used to enable interoperability among devices on a network regardless of the manufacturer of the device. This forms a home network system wherein electronic devices and Internet appliances are compatible with each other. The preferred non-limiting system 10 can run an operating system that is suitable for a home network system such as Sony Corporation' Aperios™ real time operating system.

As mentioned above and as shown in FIG. 1, the local processor 22 may be coupled to an independent service provider (ISP) host by a suitable Internet-based connection including dial-up connections, DSL (Digital Subscriber Line) or even the same transmission path 26 described above (e.g. using a cable modem) to, thus, provide access to services and content from the Internet 18.

If desired, a remote control device 30 preferably having a keypad 32 can be provided for controlling the TV/STB in accordance with means known in the art. The keypad 32 can be used to input alpha-numeric data to the TV/STB in accordance with disclosure below, and it can be in communication with the local processor 22. Other data entry devices can be used, including without limitation keypads on the television itself, voice input devices, keyboards, mice, trackballs, touchpads, etc. that can be coupled to the processor 22.

Now referring to FIG. 2, an EPG 34 can be displayed on the television 20 to list channels (only three channels shown for ease of disclosure) that are available from the source 12. Not all the listed channels, however, might be subscribed to by the user of the television 20. That is, some channels on the EPG 34 might be non-subscribed in that they are not channels authorized for clear viewing on the user's cable or satellite account. However, other channels on the EPG are subscribed to in that they are channels that are authorized for clear viewing on the account.

Assume for disclosure purposes that channels 100 and 200 in FIG. 2 are subscribed-to channels, and that channel 300 is not subscribed to. Assume further that the viewer wishes to record show 5, listed as being carried on the non-subscribed to channel 300. The user may position a cursor over the name of the show on the EPG 34 using, e.g., the remote control device 30 and press "enter" or otherwise highlight or indicate a desire to add the show to a wish list or other data structure, such as a table in a database. If desired, that action can cause a drop-down menu 36 to appear that asks whether the viewer indeed wishes to add the show to the list. The viewer then indicates "yes" or "no" using the remote control device 30. Alternatively, the viewer can manipulate the remote control device 30 to enter alpha-numeric characters representing the name of the show.

The above selection is shown in FIG. 3 at block 38. Once the show has been identified it is added, at block 40, to an electronically stored wish list that is available to the local processor 22. At block 42, the local processor 22 monitors the EPG 34 to ascertain if and when a show on the list might happen to be listed as being carried on a subscribed-to channel. When such an event occurs as indicated by decision diamond 44, the logic records the show at block 46 when it is broadcast on the subscribed-to channel. As indicated by the negative test loop from decision diamond 44 back to block 42, the monitoring for shows on the wish list can continue as long as the viewer wishes.

If desired, an alert can be generated to inform the viewer that a wished-for show has been recorded. The alert may consist of blinking the name of the show on the EPG, causing the EPG to be displayed at the point presenting the name of the show, etc. Audible alerts can also be generated, as well as other types of visual alerts, such as simple messages that might be presented on the screen 28 of the television 20 by the local processor 22.

While the particular WISH LIST FOR TELEVISION RECORDING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A system for recording televised content, comprising:
   at least one local processor;
   at least one television coupled to the local processor; and
   at least one source of television show content communicating content to the processor;

wherein a viewer of the television can add a show on a channel not subscribed to by the viewer to a wish list such that the processor monitors an electronic program guide (EPG) to ascertain when the show becomes available on a subscribed-to channel, the processor causing the show to be recorded when it becomes available on a channel subscribed to by the viewer, the subscribed-to channel being different than the channel not subscribed to.

2. The system of claim 1, wherein the processor causes the viewer to be alerted when show has been recorded.

3. The system of claim 1, comprising at least one remote control device associated with the processor, wherein the show is added to the wish list by manipulating the remote control device to enter alpha-numeric characters representing the name of the show.

4. The system of claim 1, comprising at least one remote control device associated with the processor, wherein the show is added to the wish list by manipulating the remote control device to select the show as it is displayed on an electronic program guide (EPG) of the television.

5. The system of claim 1, wherein the recording device is a digital recording device.

* * * * *